Dec. 5, 1967  C. R. CANALIZO  3,356,104
VALVES
Filed March 1, 1965

INVENTOR
CARLOS R. CANALIZO
BY
ATTORNEYS

United States Patent Office 3,356,104
Patented Dec. 5, 1967

3,356,104
VALVES
Carlos R. Canalizo, Dallas, Tex., assignor to Otis Engineering Corporation, Dallas, Tex., a corporation of Delaware
Filed Mar. 1, 1965, Ser. No. 436,196
2 Claims. (Cl. 137—516.29)

ABSTRACT OF THE DISCLOSURE

A check valve having a metal to metal seat for limiting flow therethrough in one direction and provided with an annular flexible seal member supplementing said metal to metal seating engagement for sealing the off flow through the valve; the valve body having a plurality of circumferentially spaced guide legs for centering the valve body in the housing in alignment with the seat of the housing and providing means for holding the valve unseated to permit unrestricted backflow through the valve.

---

This invention relates to valves and more particularly to back pressure or check valves.

It is an object of this invention to provide a new and improved valve.

It is a further object to provide a new and improved check or back pressure valve.

It is another object to provide a valve which opens in response to fluid flow in one direction and closes when fluid flow occurs in the opposite direction.

It is a further object to provide a check valve including an annular flexible skirt carried by a valve body adapted for limited longitudinal movement between open and closed positions within a flow passage.

It is an additional object to provide a check valve which does not require a spring to bias it toward closed position.

It is also an object of the invention to provide in a check valve engagement between an annular surface on the valve body and an annular valve seat within the valve housing forming a solid back-up or support for a resilient annular skirt carried by the valve body to prevent excessive deformation or extrusion of the resilient skirt when it is subjected to a pressure holding it in closed position.

It is a still further object to provide in a check valve a flexible annular skirt which forms a seal with the annular valve seat, the wall of the flow passage and over the line of contact between the valve body and the valve seat when the valve is in closed position.

It is another object of the invention to provide in a check valve a flexible annular skirt which has sufficient resiliency and the proper shape to bias the rim of the seal toward the wall of the flow passage when a condition of equilibrium exists around the valve, or, in other words, when no flow is occurring through the valve.

It is a further object to provide a check valve having a flexible annular skirt which is collapsible around the valve body by a normal flow through the valve.

It is a still further object of the invention to provide a check valve having a flexible skirt which will seal substantially instantly upon reversal of flow through the valve and which will then move to a fully closed position in which a portion of the head of the valve body engages the annular seat of the valve to prevent extrusion of the flexible skirt which engages the valve seat and the wall of the flow passage and seals over the joint between the head of the valve body and the valve seat.

It is another object of the invention to provide a check valve which is both extremely sensitive to quick changes in direction of fluid flow and will sustain substantial pressure differentials when in fully closed position.

Additional objects and advantages of the invention will be readily apparent from the reading of the following description of a device constructed in accordance with the invention, and reference to the accompanying drawings thereof, wherein.

Figure 1:
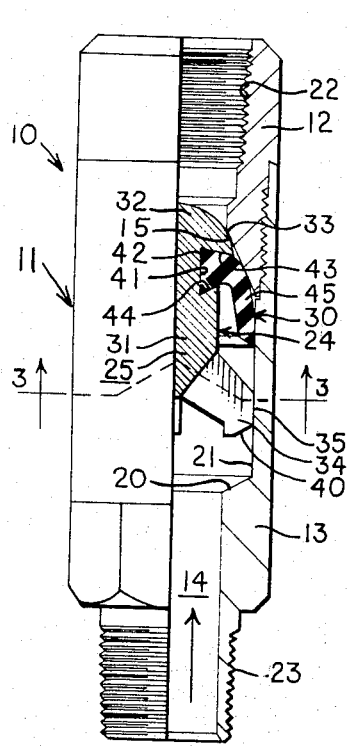
FIGURE 1 is a longitudinal view partially in section and partially in elevation of a safety valve in accordance with the invention showing the valve in closed position.

Referring to FIGURES 1–4, the check valve 10 includes a housing 11 formed by the pin section 12 threaded into the box section 13 with a flow passage 14 extending longitudinally through the length of the housing. "Normal flow" through the flow passage 14 as used herein shall mean flow in a direction which opens the valve as in FIGURE 4 while "reverse flow" means flow in a direction which closes the valve as in FIGURE 1. An internal annular valve seat 15 is formed on the lower end of the pin section facing in the direction of normal flow through the valve. The annular seat may have any desired configuration such as spherical or conical. An internal annular shoulder 20 is formed within the pin section facing the valve seat and spaced apart from the seat at the end of an enlarged, substantially uniform section 21 of the flow passage 14. The housing is provided with the internal threads 22 at one end in the pin section and external threads 23 at the other end on the box section to facilitate installation of the valve in a conduit.

The valve assembly 24 is disposed within the flow passage for limited longitudinal movement between open and closed position. The upper limit of movement is determined by the engagement of the valve assembly with the annular valve seat 15 while the downward limit is controlled by the shoulder 20. The valve assembly comprises a valve body 25 and an annular flexible skirt 30. The valve body includes a central portion 31 having a head 32 provided with an arcuate surface 33 which engages the annular seat 15 when the valve is in closed position, as shown in FIGURE 1. The configurations of the surface 33 and the seat 15 are such that they have continuous annular surfaces of contact of appreciable width. A plurality of legs 34 formed on the lower end of the body extending radially outwardly and downwardly to guide the valve assembly as it moves longitudinally within the bore and provide support for the assembly when the valve is in the full open position shown in FIGURE 4. The legs give a spider or skeleton-like configuration to the lower portion of the valve assembly body providing ample space between the legs through which fluid may flow in the flow passage. The side surface 35 of each of the legs engages the internal surface of the section 21 so that the valve assembly will be guided by the wall as the assembly reciprocates within the valve housing. The legs have shoulders 40 which slope upwardly and outwardly to conform to the slope of the shoulder 20 so that each leg will rest on the shoulder 20 when the valve assembly is in its full open or lowermost position within the housing. The distance between the valve seat 15 and the shoulder 20 defines the distance within the housing the valve assembly may reciprocate.

Figure 4:
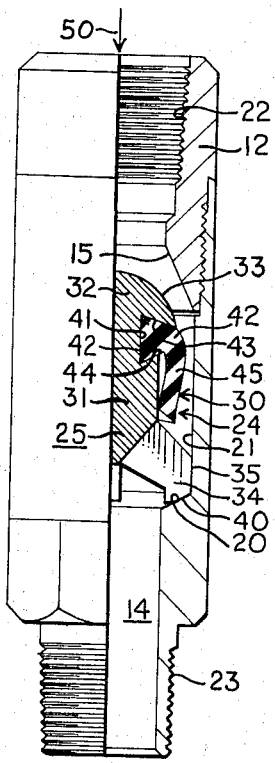
FIGURE 4 is a longitudinal view partially in section and partially in elevation illustrating the check valve of FIGURE 1 in full open position; and, FIGURE 5 is a longitudinal view partially in section and partially in elevation of a modified form of check valve in accordance with the invention, showing the valve in closed position.

The valve assembly and the housing, when the valve assembly is in open position, as shown in FIGURE 4, provide adequate space or an orifice between the valve seat and the surface 33 for the maximum rate of fluid flow for which the valve is designed.

The skirt 30 is secured around the central portion 31 of the valve body in the dove-tail shaped annular recess 41 with the inner lip 42 of the skirt being confined between the upper shoulder 43 and the lower shoulder 44. The outer annular lip 45 of the skirt is of sufficient width that at least the outer edge or rim of the lip may contact and seal against the internal surfaces of the housing section defining the portion 21 of the flow passage at any longitudinal position of the valve assembly within the housing. For example, in FIGURE 1 with the valve in fully closed position, the width of the outer lip of the valve skirt is sufficient for the skirt to seal with the housing section 13 and to have an intermediate annular portion thereof appreciable width engaging the seat 15 below the area of engagement of the head with the seat. The skirt is formed of any suitable rubber-like resilient material and may be molded on the valve body so that the inner lip will be within the annular recess around the body and firmly secured to the body. The thickness of the outer lip 45 and the material of which the skirt is formed are such that the skirt will have adequate flexibility to permit it to be collapsed inwardly around the valve body while it also will be resilient enough to bias itself outwardly to seal with the internal surface of the housing section between the seat 15 and the shoulder 20.

When the valve assembly is in its upper fully closed position and the pressure in the flow passage below the valve assembly exceeds the pressure thereabove, the body is biased upwardly in the housing and the engagement of the surface 33 of the head 32 of the body with the seat 15 now prevents upward movement of the body in the housing. In addition, an annular line of sealing engagement is established between the head and the seat. The annular downwardly facing surface 43 of the body now prevents upward movement of the upper portion of the skirt and the intermediate annular portion of the skirt between the outer and inner lips 45 and 42 engages the seat 15 along an annular continuous area of contact therebetween and also seals therebetween. The annular gap between the outermost edge of the head and the seat is so narrow that even a relatively great pressure below the valve assembly will not tend to extrude the substance of the skirt through such gap. In addition, fluid trapped in such gap between the line of sealing engagement of the head with the seat and the line of sealing engagement of the intermediate portion of the sleeve will also tend to prevent any such extrusion. Even if an actual line of fluid tight sealing engagement is not established between the head and the valve seat when the valve is in closed position, the gap between the head and seat will be so narrow that the probable extrusion of the skirt would be negligible, even at substantial pressures.

In operation the check valve is connected into a flow line, not shown, by means of the upper threads 22 and the lower threads 23. The valve is movable between one end position in which the valve is fully closed, as illustrated in FIGURE 1, and the opposite end position in which the valve may be fully open as shown in FIGURE 4. The primary function of the valve is to permit fluid flow in one direction and prohibit fluid flow in the other direction, normal flow through the valve during which the valve is open being in the direction indicated by the arrow 50 in FIGURE 4. Assume that the valve is in the closed position shown in FIGURE 1 and normal flow through the conduit is initiated in the direction of the arrow 50. As soon as the flow of fluid into the pin section 12 raises the pressure above the valve assembly, the valve assembly will be forced downwardly until the lower ends 40 on the leg members 34 engage the internal shoulder 20. When the surface 33 on the head of the valve assembly is separated from the valve seat 15 fluid may flow through the valve seat around the head into contact with the outer surface of the skirt 30 tending to collapse the skirt inwardly out of sealing engagement with the wall of the passageway. Generally the collapse of the skirt begins while the valve assembly is moving downwardly and is completed when the ends 40 on the legs are engaged with the annular shoulder 20. At this stage, the head of the valve body is sufficiently spaced apart from the valve seat to allow the maximum flow rate past the head, as shown in FIGURE 4, with the skirt being fully collapsed inwardly around the valve body allowing the fluid to continue its downward flow past the valve body around and between the legs 34 to exit from the valve through the lower portion of the passageway 14 through the box section 13. Of course, the degree of collapse of the valve skirt, whether it is fully collapsed as shown in FIGURE 4 or only partially collapsed with the lip 45 somewhere between the external surface of the body of the valve assembly and the inner surface of the section 21 of the passageway, will depend upon the resilience of the skirt and the flow rate through the valve.

When normal fluid flow through the valve ceases and a state of pressure equilibrium is reached within the valve, the resiliency of the skirt will cause the outer lip to expand outwardly until the outer rim of the skirt engages the inner wall 21 of the enlarged section of the passageway. Thus, at this step in the operation of the valve, the valve assembly will be in a downward position as shown in FIGURE 4 while the skirt will have expanded outwardly to seal with the wall of the passageway. Simply stopping fluid flow through the valve will not result in upward longitudinal movement of the valve assembly but rather will allow the skirt of the valve to return to its normal seal relationship with the wall of the passageway since the resiliency of the skirt biases it toward engagement with the passageway wall.

When reverse flow occurs pressure of the fluid within or beneath the skirt will force the valve assembly to the fully closed position illustrated in FIGURE 1 with upward travel of the assembly being limited by the engagement of the surface 33 on the head of the valve body with the annular valve seat 15. The skirt will again seal against the lower inner face or shoulder 43 of the head of the valve body, against the valve seat 15 and the wall of the passageway with the contact between the valve seat and the valve body head preventing extrusion of the skirt.

It will, of course, be recognized that if at the moment normal fluid flow ceases reverse fluid flow begins the skirt will immediately expand outwardly to seal with the wall of the passageway while simultaneously the valve assembly will begin upward movement toward the fully closed position shown in FIGURE 1. It is to be understood, however, that though the terminology "fully closed" is used in connection with the position of the valve when the head of the valve body is engaged with the valve seat, reverse flow cannot occur subsequent to re-engagement of the rim of the skirt lip with the wall of the passageway irrespective of the longitudinal position of the valve assembly in the housing. Thus, reverse flow is prohibited at any time conditions around the valve skirt reach near enough to equilibrium that the skirt moves outwardly into engagement with the wall of the passageway. Since in order to prohibit reverse flow through the valve it is only necessary that the valve skirt expand outwardly into engagement with the wall of the passageway, the lag between open and closed position of the valve is minimized with closure being effected almost instantly upon flow reversal or termination of normal flow without valve chattering.

It will now be evident that there has been described and illustrated a new and improved form of check valve.

It will be seen that the chattering normally inherent in a spring loaded check valve is eliminated in the valve of the invention.

It will be further seen that the check valve includes a resilient flexible skirt biased toward a closed position to cause the skirt to be substantially instantly responsive to changes in fluid flow.

It will, in addition, be seen that the rim of the valve skirt will seal against the housing wall at all longitudinal positions of the valve assembly in the housing.

It will also be seen that the engagement of the valve surface on the head of the valve assembly with the annular valve seat provides a substantially solid back-up or support for the valve skirt thus precluding extrusion of the skirt even when substantial pressures are exerted on the valve beneath the skirt.

It will additionally be seen that the valve is reciprocable within its housing between fully closed and fully open positions.

Figure 5:
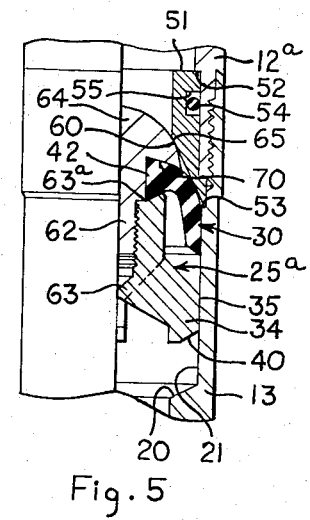
Figures 2, 3:
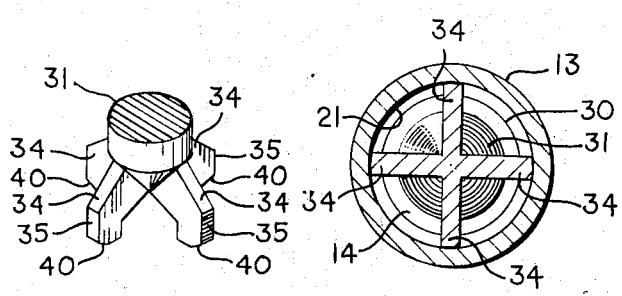
FIGURE 2 is a fragmentary view in perspective of the lower portion of the body of the valve of FIGURE 1, illustrating particularly the spider or skeleton portion of the valve body.
FIGURE 3 is a view in section taken along the line 3—3 of FIGURE 1.

An alternative form of construction of the valve is illustrated in FIGURE 5 wherein identical parts will be designated by the same reference numerals as used in FIGURE 1, while substantially similar parts as shown in FIGURE 1 will be indicated by the same reference numerals with the subscript *a* added. The housing of the check valve is formed by the pin section 12*a* threaded into the box section 13 with the flow passage 14 extending through the housing and an upwardly facing internal annular shoulder 20 being formed at the lower end of the enlarged section 21 of the flow passage. An annular valve seat member 51 is disposed within the pin section with the seat member being held against upward movement by the internal annular shoulder 52 within the pin section and against downward movement by the internal annular shoulder 53 within the box section. The O-ring 54 positioned in the external recess 55 of the seat member seals between the seat member and the pin section. An internal annular valve seat 60 is formed on the seat member corresponding to the valve seat 15 of the check valve of FIGURE 1.

The valve assembly 25*a* is disposed in and adapted for longitudinal movement within the flow passage of the valve housing. The valve assembly includes a central body section 62 threaded into a spider section 63 which is provided with the downwardly and outwardly extending legs 34 corresponding identically in function and structure to the legs 34 of the check valve of FIGURE 1. The body 62 has a head member 64 providing an annular spherical surface 65 to engage the annular valve seat 60 when the valve is in the closed position illustrated. The head member 64 provides an external annular downwardly facing shoulder 70 which cooperates with the upper end 63*a* of the spider section to secure the inner lip 42 of the annular skirt 30 in the valve assembly. The annular skirt is identical in all respects both structural and functionally to the annular skirt 30 previously discussed with respect to the check valve 10. In view of the construction of the valve assembly with the central sections 62 being threaded into the spider section the skirt may be molded separately and secured between the central section and the spider section.

The function and operation of the check valve illustrated in FIGURE 5 is identical in all respects to that of the check valve 10 shown in FIGURE 1. To move to the fully open position, the valve assembly is displaced downwardly from the closed position of FIGURE 5 until the lower ends 40 of the legs 34 engage the internal annular shoulder 20 with the annular skirt being collapsed inwardly by the fluid flow to allow the fluid to flow around the head down along the skirt within the wall of the section 21, through and around the legs, and out of the valve through the lower end of the box section.

It will be evident that there has also been described in FIGURE 5 a new and improved form of check valve which provides an annular resilient skirt constantly biased toward the wall of the passageway through the valve, and when the valve is closed, engagement of the surface of the head of the valve assembly with the annular valve seat provides a solid back-up structure precluding extrusion of the valve skirt by substantial pressures.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A check valve for allowing fluid flow in a first direction and prohibiting fluid flow in a second direction including: a housing comprising a pin section threaded to a box section, said sections having connecting bores therethrough forming a flow passage throughout the length of said housing, said pin section having an internal annular valve seat facing said box section and said box section having an internal annular shoulder spaced apart from and facing valve seat; a valve assembly slidably disposed within said housing for longitudinal movement between a fully closed position when said valve assembly engages said valve seat and a fully open position when said valve assembly engages said annular shoulder; said valve assembly comprising a central valve body, a head member formed on one end of said body and provided with an external annular substantially spherical face engageable with said valve seat when said valve assembly is in closed position, said valve body having an external annular inwardly divergent dovetail shaped recess adjacent to said head member, a plurality of leg members formed on the other end of said valve body extending longitudinally beyond the end of said body away from and radially outwardly from said body for supporting said valve assembly from said internal annular shoulder in its fully open position, said body being sharply longitudinally tapered away from the head between said leg members, said leg members being circumferentially spaced apart from each other to provide flow space between said members and each having a lower shoulder engageable with said internal annular shoulder limiting the longitudinal movement of said valve assembly away from said valve seat, and an annular flexible sealing skirt engaged on said valve body, said skirt having an internal annular flared inner lip confined in said dovetail recess around said body and an outer lip sloping outwardly from said body and along the longitudinal axis of said body away from said head member, said tapered portion of said body between said leg portions being disposed at a point adjacent the free end of said outer lip of said sealing skirt to provide an unrestricted flow passage between said leg members, said outer lip being yieldably engaged with the inner wall of said flow passage at all positions of said valve assembly between said valve seat and said annular shoulder and being collapsible inwardly around said valve body in response to fluid flow through said flow passage in a direction from said valve seat toward said annular shoulder, and said skirt being engageable with the inner wall of said housing defining said flow passage, said valve seat, and over the line of contact between said head member and said valve seat, the engagement of said head member and said valve seat restraining said skirt from extrusion between said head member and said valve seat when said valve assembly is in fully closed position.

2. A check valve according to claim 1 wherein said central valve body comprises a male section projecting longitudinally distally of said head portion and threaded into a female section formed in the central portion of the body member, the open end of said female section having an annular inclined shoulder forming one surface of said dovetailed recess around said valve body whereby said internal annular flared inner lip of said flexible skirt may be engaged with and disengaged from said valve body by assembly and disassembly of said male and female sections, and said annular valve seat is formed on an annular valve seat insert member engaged between said pin section and said box section, said valve seat member being held against movement in one direction by an internal annular shoulder within said pin section and held against movement in the opposite direction by an internal annular shoulder within said box section.

References Cited

UNITED STATES PATENTS

| | | | |
|---|---|---|---|
| 2,185,173 | 1/1940 | Fortune | 137—519 |
| 2,949,929 | 8/1960 | Moore | 137—516.29 |
| 2,949,930 | 8/1960 | Moore | 137—516.29 |
| 3,027,907 | 4/1962 | Lee | 137—516.29 |

WILLIAM F. O'DEA, *Primary Examiner.*

W. H. WRIGHT, *Assistant Examiner.*